US009679126B2

(12) United States Patent
Warrier

(10) Patent No.: US 9,679,126 B2
(45) Date of Patent: Jun. 13, 2017

(54) DECRYPTION DEVICE, METHOD FOR DECRYPTING AND METHOD AND SYSTEM FOR SECURE DATA TRANSMISSION

(71) Applicant: SAP SE, Walldorf (DE)

(72) Inventor: Srinath Warrier, Thane (IN)

(73) Assignee: SAP SE, Walldorf (DE)

( * ) Notice: Subject to any disclaimer, the term of this patent is extended or adjusted under 35 U.S.C. 154(b) by 17 days.

(21) Appl. No.: 14/522,371

(22) Filed: Oct. 23, 2014

(65) Prior Publication Data
US 2016/0103984 A1    Apr. 14, 2016

(30) Foreign Application Priority Data

Oct. 13, 2014  (EP) .................................... 14003507

(51) Int. Cl.
*G06F 21/32* (2013.01)
*G06F 21/62* (2013.01)
*G06F 21/60* (2013.01)
*H04L 9/08* (2006.01)

(52) U.S. Cl.
CPC ............ *G06F 21/32* (2013.01); *G06F 21/606* (2013.01); *G06F 21/6209* (2013.01); *G06F 21/6245* (2013.01); *H04L 9/0866* (2013.01)

(58) Field of Classification Search
CPC combination set(s) only.
See application file for complete search history.

(56) References Cited

U.S. PATENT DOCUMENTS

| 2003/0072059 | A1* | 4/2003 | Thomas | H04J 14/028 398/167.5 |
| 2009/0310819 | A1* | 12/2009 | Hatano | G06F 21/6245 382/100 |
| 2011/0213664 | A1* | 9/2011 | Osterhout | G02B 27/017 705/14.58 |
| 2012/0075168 | A1* | 3/2012 | Osterhout | G02B 27/017 345/8 |
| 2012/0122570 | A1* | 5/2012 | Baronoff | A63F 13/216 463/31 |
| 2012/0194551 | A1* | 8/2012 | Osterhout | G02B 27/0093 345/633 |
| 2012/0200601 | A1* | 8/2012 | Osterhout | G02B 27/0093 345/633 |

(Continued)

FOREIGN PATENT DOCUMENTS

EP    2 043 293    4/2009

OTHER PUBLICATIONS

European Search Report for Application No. 14003507.2 mailed Jan. 30, 2015.

*Primary Examiner* — Taghi Arani
*Assistant Examiner* — Phy Anh Vu
(74) *Attorney, Agent, or Firm* — Jones Day

(57) ABSTRACT

A decryption device for decrypting a document encrypted using biometric information of an intended receiver of the document is provided. The decryption device comprises: an imaging device configured to capture an image of at least a portion of the document; a biometric detection device configured to detect biometric information of a user; a processor configured to decrypt at least the portion of the document using the captured image and the detected biometric information; and a display device configured to display at least the portion of the document decrypted by the processor.

17 Claims, 10 Drawing Sheets

(56) References Cited

U.S. PATENT DOCUMENTS

| | | | |
|---|---|---|---|
| 2012/0232677 A1* | 9/2012 | Yoo | G08C 17/00 |
| | | | 700/7 |
| 2014/0070959 A1* | 3/2014 | Bhargava | H04Q 9/00 |
| | | | 340/870.07 |
| 2014/0098132 A1* | 4/2014 | Fein | G06T 19/006 |
| | | | 345/633 |
| 2014/0146819 A1* | 5/2014 | Bae | H04L 67/327 |
| | | | 370/392 |
| 2014/0247278 A1* | 9/2014 | Samara | G06K 17/0016 |
| | | | 345/633 |

* cited by examiner

DECRYPTION DEVICE, METHOD FOR DECRYPTING AND METHOD AND SYSTEM FOR SECURE DATA TRANSMISSION

CROSS-REFERENCE TO RELATED APPLICATIONS

This application claims priority of EP Patent Application No. 14 003 507.2 filed on Oct. 13, 2014 which is herein incorporated by reference in its entirety.

BACKGROUND

The application relates to a decryption device, method for decrypting and method and system for secure data transmission.

For secure communication of an electronic document over a communication network, the document can be encrypted in a manner that only an intended receiver of the document can decrypt the document. For encrypting and decrypting documents, several cryptography techniques are known. Techniques of cryptography may generally be divided into two groups: symmetric-key cryptography and public-key cryptography.

In symmetric-key cryptography, a sender and receiver of a document share the same key for encryption and decryption of the document. The key must be kept secret to parties other than the sender and the receiver in order to securely communicate the document.

In public-key cryptography, a pair of keys including a public key and a private key is employed for encryption and decryption of the document. The public key and its corresponding private key are different, separate keys but are mathematically linked to each other. The public key may be made available to the public but the private key must be kept secret to parties other than the owner of the key pair. Thus, the private key may be also referred to as a secret key. The sender of a document can encrypt the document using the public key of the receiver of the document, send the encrypted document to the receiver and the receiver can decrypt the encrypted document with his/her private key.

Either in symmetric-key cryptography or public-key cryptography, encryption of the document may be performed within a secure environment of the sender of the document. Further, the decryption of the document may be performed within a secure environment of the receiver of the document. For example, when electronically communicating via email, the secure environments of the sender and the receiver may be, for example, inside office buildings with secure intranets protected by firewall software from malicious access via the Internet. The document may be transmitted (e.g. sent via email) outside the secure environment of the sender only after encryption of the document. Further, the decryption of the document may be performed only after the encrypted document arrives in the secure environment of the receiver (e.g. received via email). In other words, the document would have encrypted content when the document is outside the secure environments of the sender and the receiver. Thus, even if a third party intercepts the document during transmission, the third party would not be able to understand the content of the document since its content is encrypted.

In some circumstances, further improvement of the security in communicating a document may be required.

SUMMARY

According to one aspect, a decryption device for decrypting a document encrypted using biometric information of an intended receiver of the document is provided. The decryption device may comprise the following:

an imaging device configured to capture an image of at least a portion of the document;
a biometric detection device configured to detect biometric information of a user;
a processor configured to decrypt at least the portion of the document using the captured image and the detected biometric information; and
a display device configured to display at least the portion of the document decrypted by the processor.

In various aspects stated herein, the "document encrypted using biometric information" may be either an electronic document or a physical document. An electronic document may include digital content that can be displayed, for example, on a screen of an electronic device such as a computer and a mobile device. A physical document may have its content printed on a physical medium such as paper. A physical medium may be any medium on which the content of the document can be printed. In case of an electronic document, the imaging device may capture an image of at least a portion of the encrypted electronic document that is displayed on a display device of an electronic device, e.g. a computer or a mobile device. In case of a physical document, the imaging device may capture an image of at least a portion of a physical medium, e.g. paper, on which encrypted contents of the document is printed. In either case of an electronic document and a physical document, visual representation of the encrypted contents of the document may be presented to a user and the imaging device may capture an image of the visual representation.

The decryption device may be implemented on a mobile device. For example, the decryption device in various aspects as stated herein may be a mobile device. In other words, a mobile device may include the features of the decryption device in various aspects as stated herein. In various aspects, examples of a "mobile device" may include, but not be limited to, a mobile phone, a tablet computer, a PDA (personal digital assistant) and a laptop computer.

The decryption device may be implemented on a wearable device. For example, the decryption device in various aspects as stated herein may be a wearable device. In other words, a wearable device may include the features of the decryption device in various aspects as stated herein.

In one example, the wearable device may be in a form of glasses. In the example in which the wearable device is in a form of glasses, the biometric information used for encrypting the document may be obtained from an image of at least one eye of the intended receiver. Further, in this example, the biometric detection device may be an eye scanner configured to detect biometric information from an image of at least one eye of the user.

In various aspects, the biometric detection device may be configured to obtain the biometric information from a fingerprint, an image of an eye, an image of a face, an image of palm veins, a palm print or a voiceprint.

According to another aspect, a method for decrypting a document encrypted using biometric information of an intended receiver of the document is provided. The method may comprise the following:

capturing, by an imaging device, an image of at least a portion of the document;
detecting, by a biometric detection device, biometric information of a user;
decrypting, by a processor, at least the portion of the document using the captured image and the detected biometric information; and displaying, by a display device, at least the portion of the document decrypted by the processor.

Said decrypting at least the portion of the document may include generating a key for decrypting the document from the detected biometric information of the user.

In yet another aspect, a method for secure data transmission is provided. The method may comprise the following:
  encrypting, by a processor, a document using biometric information of an intended receiver;
  outputting, by the processor, the encrypted document as an electronic document and/or as a physical document; and
  steps of any of the methods in various aspects and examples as stated herein for decrypting a document encrypted using biometric information of an intended receiver of the document.

Said encrypting a document may include generating a key for encrypting the document from the biometric information of the intended receiver.

In one example, said encrypting and said decrypting may be performed according to a symmetric-key cryptography algorithm. In another example, said encrypting and said decrypting may be performed according to a public-key cryptography algorithm.

In yet another aspect, a system for secure data transmission is provided. The system may comprise the following:
  an encryption device including a processor configured to:
    encrypt a document using biometric information of an intended receiver; and
    output the encrypted document as an electronic document and/or as a physical document; and
  the decryption device in various aspects and examples as stated herein.

The processor of the encryption device and/or the processor of the decryption device may be further configured to perform operations according to the method in various aspects and examples as stated herein.

Further, the decryption device in various aspects and examples as stated herein may perform operation according to any of the method in various aspects and examples as stated herein.

BRIEF DESCRIPTION OF THE DRAWINGS

Details of exemplary embodiments are set forth below with reference to the exemplary drawings. Other features will be apparent from the description, the drawings, and from the claims.

DETAILED DESCRIPTION OF EMBODIMENTS

In the following text, a detailed description of examples will be given with reference to the drawings. It should be understood that various modifications to the examples may be made. In particular, one or more elements of one example may be combined and used in other examples to form new examples.

An electronic document can be transmitted by means to transfer data using modes like emails via the Internet, SMS (short message service) via mobile phones etc. These modes may be encrypted using a cryptography algorithm according to, for example, symmetric-key cryptography or public-key cryptography. When the receiver receives the encrypted document with his/her electronic device such as a computer or a mobile device, the encrypted document can be decrypted by the electronic device and shown on a display of the electronic device. Once the decrypted document is displayed on the display, not only the intended receiver but also anyone who is nearby might be able to read the document. For example, in a chat-based application on a mobile device, a chat sent by a sender to a receiver could be visible to anyone who gets access to the mobile and the application, even if the application employs a cryptography algorithm for transmitting the chat data. It may be, however, preferably available only to the relevant two people.

A confidential document that may need to be encrypted can be not only an electronic document but also a physical document. A physical document may be, for example, a document printed on paper or any other physical medium. A paper document can be easily read by anyone who obtains the document. Thus, measures may have to be taken also for ensuring security of a paper document including confidential information. For example, a checkbook is still used as a primary mode of transferring money in many parts of the world. Also, the fear of a check being intercepted is still valid in many of these places. The data mentioned on the check is ideally supposed to be seen only by a set of few selected people and not everyone.

Various examples as will be described below may be applicable to both electronic documents and physical documents.

Figure 1:
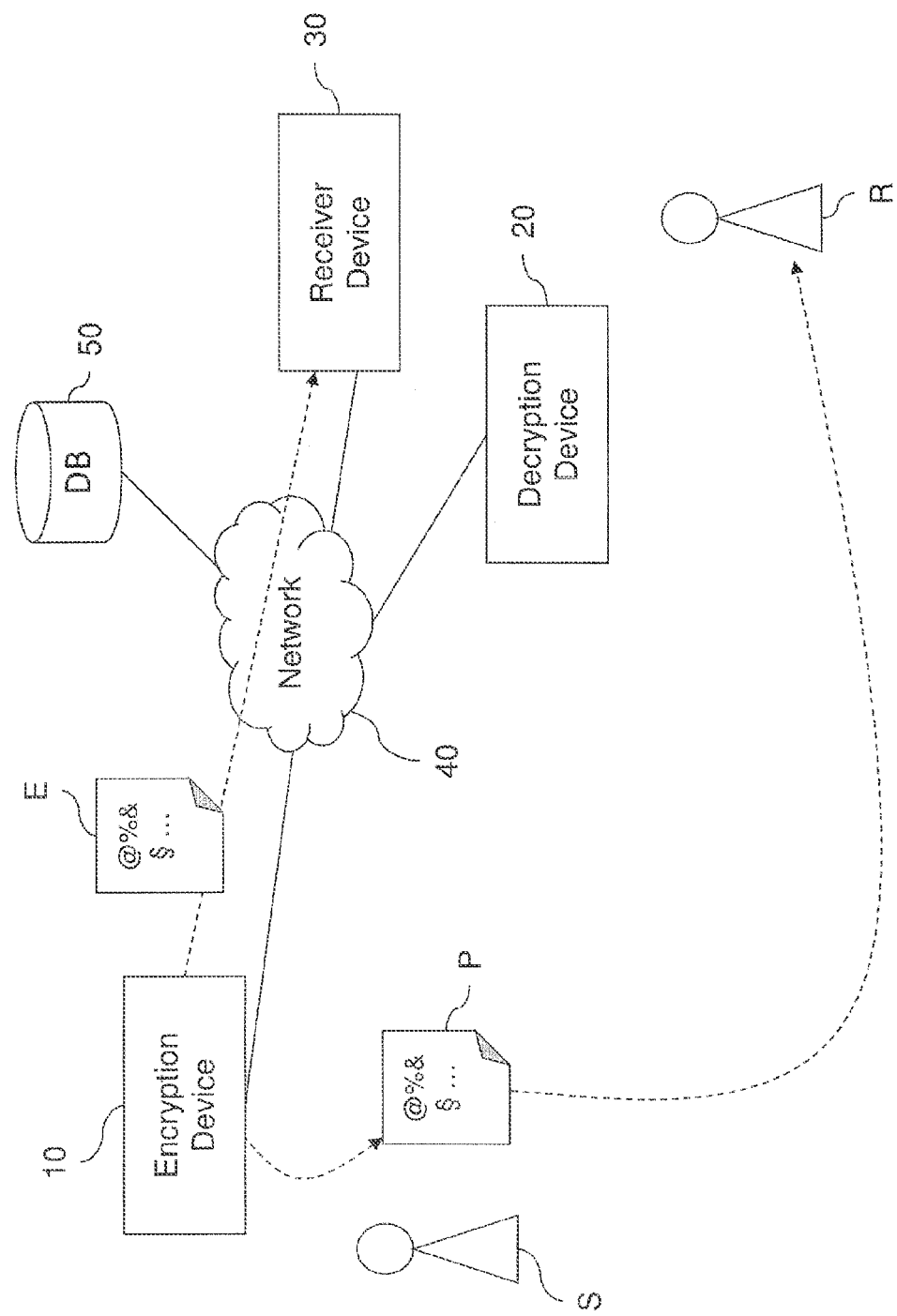
FIG. 1 shows an example of how an encrypted document may be sent from a sender to a receiver.

FIG. 1 shows an example of how an encrypted document may be sent from a sender to a receiver. An exemplary system shown in FIG. 1 may include an encryption device 10, a decryption device 20, a receiver device 30, a network 40 and a database (DB) 50. In the example shown in FIG. 1, a sender S may encrypt a document using the encryption device 10 and send the encrypted document to a receiver R. The receiver R may decrypt the encrypted document sent by the sender S using the decryption device 20.

In one example, the sender S may be a company or an organization that issues documents for its customers, members and/or other people who interact with that company or organization. More specific examples of the sender S may include, but not limited to, a financial institution such as a bank, a medical institution such as a hospital, an insurance company and a governmental organization. The receiver R may be an individual or a group of people who may receive confidential documents from the sender S. In another example, the sender S may be an individual person.

The encryption device 10 may be configured to encrypt a document using biometric information of the receiver R of the document. The biometric information may represent human characteristics and traits. For example, the biometric information may be obtained from a fingerprint, an image of an eye, an image of a face, an image of palm veins, a palm print or a voiceprint. Other information representing human characteristics and traits may also be employed for obtaining the biometric information. In various examples as described herein, the biometric information can be used as or used for generating a key for encryption and/or decryption. The biometric information may include features extracted from human characteristics as exemplified above.

The database 50 may store information used for encrypting a document. For example, in case of employing symmetric-key cryptography, the database 50 may store biometric information of possible receivers of documents issued by the sender S. The encryption device 10 may be connected to the database 50 via the network 40. The sender S may request the receiver R beforehand to register his/her biometric information to be used in the encryption of a document for the receiver R. For example, the receiver R may personally visit a facility of the sender S and have his/her biometric information detected by a detection device at the facility. The sender S may then store the biometric information of the receiver R in the database 50. Alternatively, the receiver R may have his/her biometric information detected by a detection device of his/her own and send the biometric information to the database 50 via the network 40. When storing the biometric information in the database 50 via the network 40, care may have to be taken to establish a secure communication from the detection device of the sender S and/or receiver R to the database 50.

Further, for example, in case of employing public-key cryptography, the database 50 may store public keys of possible receivers of documents issued by the sender S. The receiver R may, for instance, let the decryption device 20 generate his/her key pair, a public key and a private key, using his/her biometric information. The decryption device 20 may then store the public key in the database 50, thereby providing the public key to the sender S.

The encryption device 10 may access the database 50 to obtain the biometric information or the public key of the receiver R when encrypting a document to be sent to the receiver R.

The encryption device 10 may output the encrypted document as a physical document P and/or an electronic document E. The physical document P may be, for example, a paper document on which the encrypted content of the document is printed. The physical document P may be sent to the receiver R from a sender S of the document by physically transferring the physical document P. Since the physical document P has encrypted content, even if the physical document P is taken or received by someone other than the receiver R, that person cannot understand the content of the physical document P. Accordingly, transferring a physical document P with encrypted content may improve security.

The electronic document E may include the encrypted content of the document in a digital format. The electronic document E may be sent, for example, from the sender S using the decryption device 10 to the receiver device 30 via the network 40. The network 40 may be a communication network such as a LAN (local area network), a WAN (wide area network) and the Internet. The receiver device 30 may be a computer configured to receive an electronic document via the network and visually display the received document on a display device. Examples of a computer that can function as the receiver device 30 may include, but not limited to, a personal computer, a server computer, a laptop computer, a tablet computer, a PDA, a mobile phone, etc. In various examples described herein, the receiver device 30 may not decrypt the electronic document E received from the sender. The network 40 may involve at least one of a wireless network and wired network. In another example, the electronic document E may be sent to a device (not shown) of the sender S from the encryption device via the network 40 or another network and then the device of the sender S may send the electronic document E to the receiver device 30 via the network 40.

When the physical document P is sent to the receiver R, the receiver R can view the encrypted content of the document by simply looking at the physical document P itself. When the electronic document E is sent to the receiver device 30, the receiver R can view the encrypted content of the document by making the receiver device 30 display the encrypted content of the document on its screen, for example.

In the following, the term "document" may refer to both the physical document P and the electronic document E, unless otherwise noted.

In order for the receiver R to understand the content of the encrypted document sent by the sender S, the document must be decrypted. The decryption device 20 may be configured to decrypt an encrypted document. For example, the decryption device 20 may capture an image of at least a portion of the document, detect biometric information of the receiver R and decrypt the document using the captured image and the detected biometric information. The decryption device 20 may then present the decrypted document to the receiver R.

An Augmented Reality (AR) device may be used for implementing the decryption device 20 in various examples described herein. AR is a live, direct or indirect, view of a physical, real-world environment whose elements are augmented (or supplemented) by computer-generated sensory input such as sound, video, graphics or GPS (Global Positioning System) data. AR is related to a more general concept called mediated reality, in which a view of reality is modified (possibly even diminished rather than augmented) by a computer. An AR device may be a mobile device or a wearable device. Examples of a mobile device may include, but not limited to, a mobile phone, tablet computer, PDA (personal digital assistant) or laptop computer. A wearable device may include a computer and may be worn by a person. Examples of a form of a wearable device may include, but not limited to, a watch, bracelet, anklet and glasses. An AR device as an example of the decryption device 20 may capture an image of at least a portion of the encrypted document as the user views the document with the AR device, decrypt the document using biometric information of the user and provide the user with an augmented view of the decrypted document.

Exemplary Embodiments with Symmetric-Key Cryptography

In the following, exemplary embodiments involving symmetric-key cryptography is described with reference to FIGS. 2 to 5. In the exemplary embodiments as will be described below, the encryption device 10, the decryption device 20, the receiver device 30 and the database 50 may be connected via the network 40, as shown in FIG. 1. In symmetric-key cryptography, the sender and receiver of a document may share a common key for encryption and decryption of the document. In other words, the encryption key and the decryption key may be identical. Examples of symmetric-key cryptography algorithms may include, but not limited to, AES (advanced encryption standard) and DES (data encryption standard).

Figure 2:
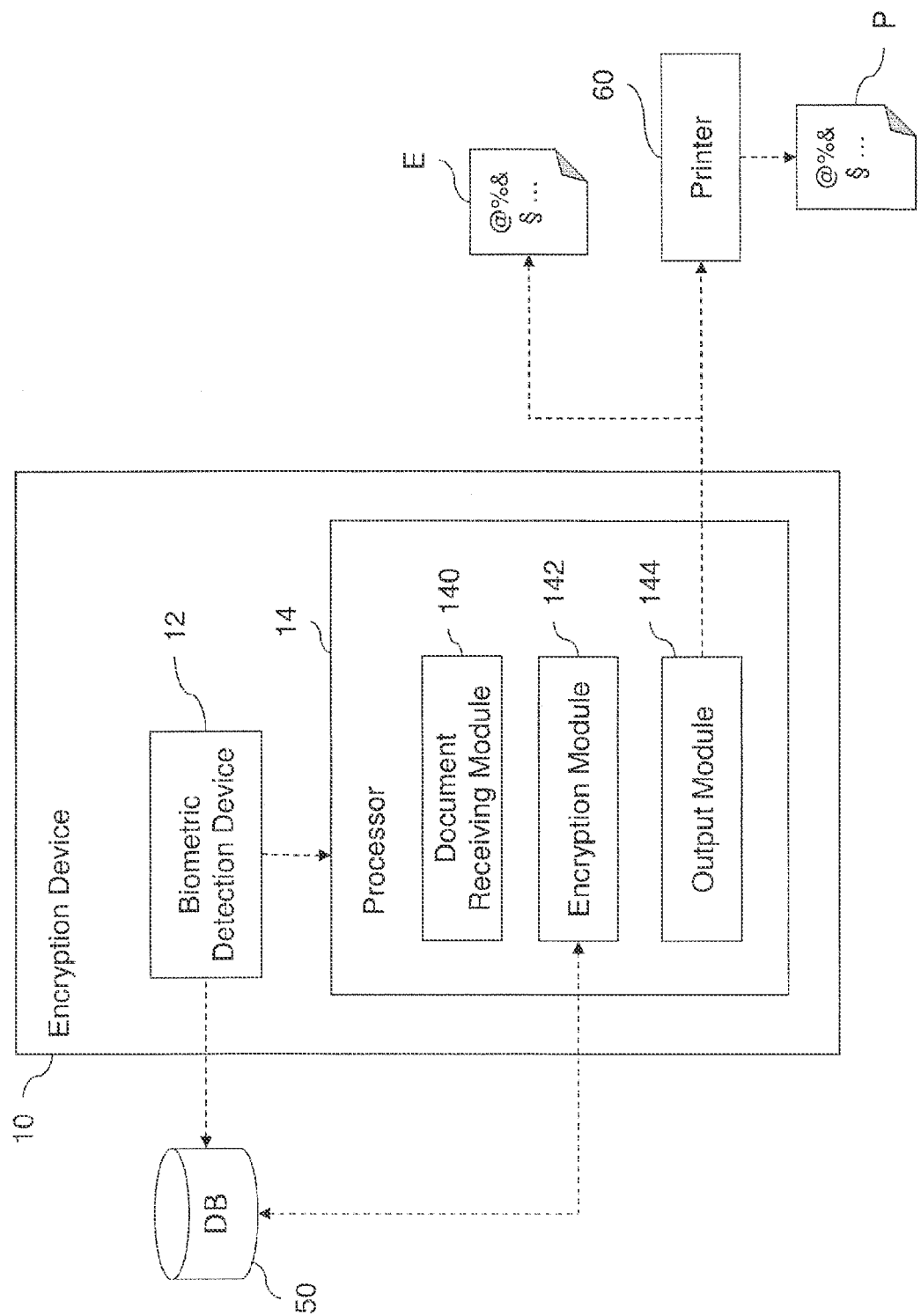
FIG. 2 shows an exemplary functional block diagram of an encryption device.

FIG. 2 shows an exemplary functional block diagram of the encryption device 10. The encryption device 10 shown in FIG. 2 may include a biometric detection device 12 and a processor 14.

The biometric detection device 12 may be configured to detect biometric information of a human. For example, the biometric detection device 12 may detect biometric information of an intended receiver of an encrypted document. The biometric detection device 12 may have a configuration suitable for the type of required biometric information. For example, when a fingerprint is used as the biometric information for encryption of the document, the biometric detection device 12 could be a fingerprint sensor. In another example, when a pattern of an iris or retina is used as the biometric information for encryption, the biometric detection device 12 could be an eye scanner configured to detect the biometric information from an image of at least one eye of a human. The biometric detection device 12 may be further configured to store the detected biometric information in the database 50. Further, the biometric detection device 12 may be configured to receive an input indicating the identification information (e.g., name and/or assigned ID number) of the owner of the biometric information and store the identification information in the database 50 in association with the detected biometric information.

The processor 14 may be configured to perform various processing to encrypt a document. The processor 14 may include a document receiving module 140, an encryption module 142 and an output module 144.

The document receiving module 140 may be configured to receive an electronic document to be encrypted. The document receiving module 140 may receive the electronic document to be encrypted from an external computer (not shown) connected to the encryption device 10, an external database (not shown) which stores the electronic document and/or a storage device (not shown) within the encryption device 10.

The sender S may provide the processor 14 with an input indicating which document to encrypt and the intended receiver of the document, using an input device (not shown) of the encryption device 10. Alternatively or in addition, an application (not shown) such as a chat-based application may instruct the document receiving module 140 which document (e.g. chat message) to encrypt and to whom the document should be sent. Such an application may be included within the encryption device 10 or in a computer external to the encryption device 10.

The encryption module 142 may be configured to encrypt the document using the biometric information of an intended receiver of the document received at the document receiving module 140. For example, the encryption module 142 may retrieve the biometric information of the intended receiver from the database 50 and encrypt the document using the biometric information as an encryption key. The biometric information as an encryption key can be considered as a secret key of a symmetric-key cryptography algorithm. Alternatively, instead of using the biometric information itself as an encryption key, the encryption module 142 may generate an encryption key from the biometric information. An encryption key generated from the biometric information can also be considered as a secret key of a symmetric-key cryptography algorithm. In this case, the decryption device 20 may need to be configured to generate a key from biometric information using the same key generation algorithm as the encryption module 142 of the encryption device 10.

When the encryption module 142 accesses the database 50 to retrieve the biometric information, the sender S using the encryption device 10 may need to be authenticated using, for example, authentication information of the sender S (e.g., identification information and a password).

The output module 144 may be configured to output the document encrypted by the encryption module 142 as an electronic document E and/or as a physical document P. When the output module 144 outputs the encrypted document as an electronic document E, the output module 144 may, for example, send out the electronic document E via the network 40 toward the receiver device 30. Alternatively or in addition, the output module 144 may store the electronic document E in a storage device (not shown) within and/or external to the encryption device 10. The electronic document E stored in the storage device may subsequently be sent to the receiver device 30 via the network 40 from a computer (not shown) of the sender S. When the output module 144 outputs the encrypted document as a physical document P, the output module 144 may, for example, instruct a printer 60 to print out the encrypted document on paper. The printer 60 may be a printing device configured to print electronic data on paper. The printer 60 may include, in addition to the printing functionality, functionalities of scanner, copier and/or facsimile machine. The physical document P printed by the printer 60 may physically be transferred to the receiver R. In the above example where the electronic document E is stored in the storage device (not shown), the electronic document E may later be printed out as a physical document P (with encrypted content) and this physical document P may be transferred to the receiver R.

Further, although the exemplary encryption device 10 shown in FIG. 2 includes the biometric detection device 12, in other examples, the biometric detection device 12 may be provided external to the encryption device 10.

Figure 3:
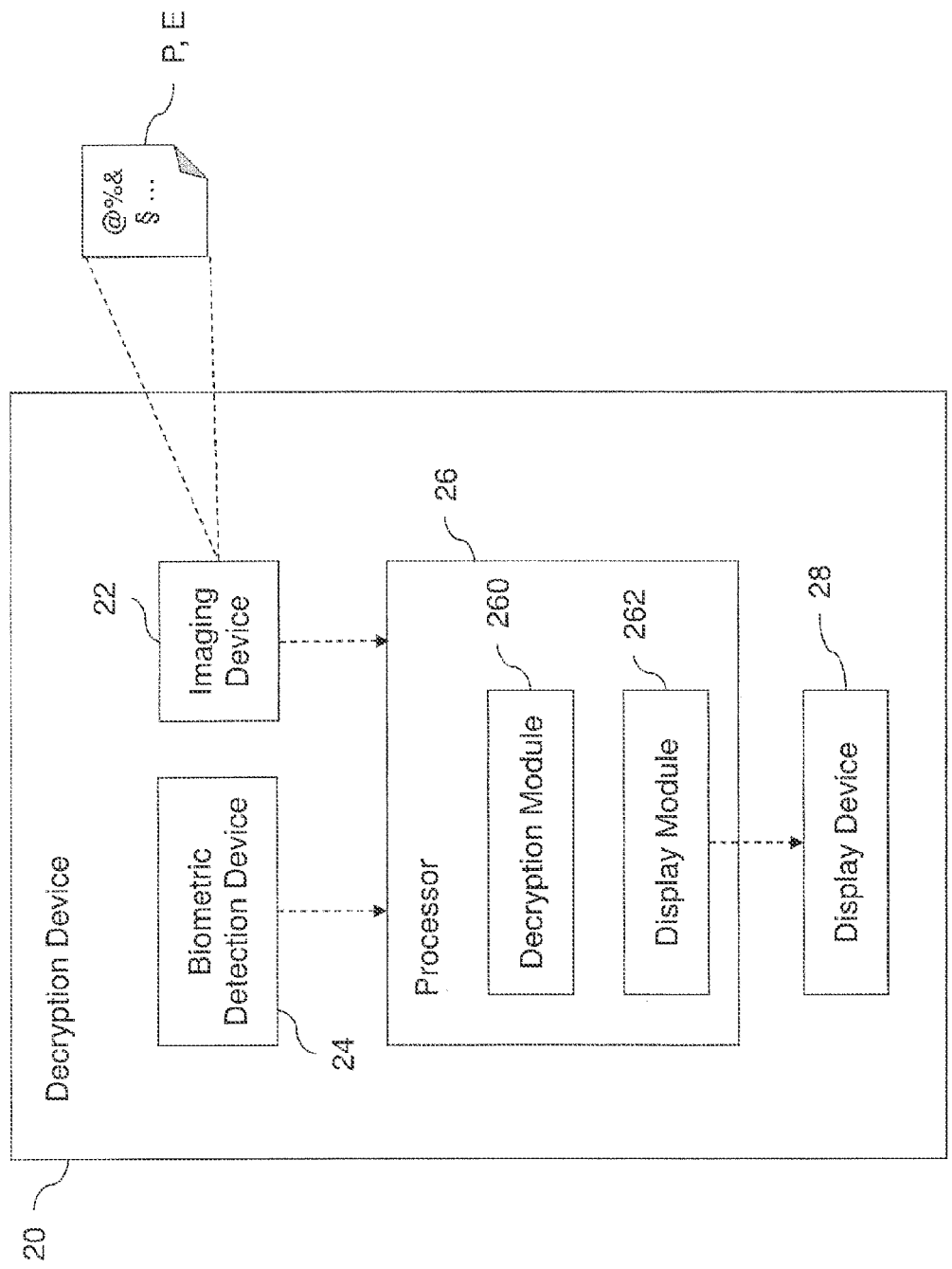
FIG. 3 shows an exemplary functional block diagram of a decryption device.

FIG. 3 shows an exemplary functional block diagram of the decryption device 20. The decryption device shown in FIG. 3 may include an imaging device 22, a biometric detection device 24, a processor 26 and a display device 28.

The imaging device 22 may be configured to capture an image of at least a portion of the document encrypted by the encryption device 10. For example, in case the receiver R has received the physical document P with encrypted content, the imaging device 22 may capture an image of at least a portion of the physical document P. Further, for example, in case the receiver R has received the electronic document E with encrypted content at the receiver device 30, the imaging device 22 may capture an image of at least a portion of the electronic document E displayed on a display or screen of the receiver device 30.

The biometric detection device 24 may be configured to detect biometric information of a human. For example, the biometric detection device 24 may detect biometric information of a user of the detection device 20. The biometric detection device 24 may have the same configuration as the biometric detection device 12 of the encryption device as described above with reference to FIG. 2.

The processor 26 may be configured to perform various processing to decrypt a document encrypted by the encryption device 10. The processor 26 may include a decryption module 260 and a display module 262.

The decryption module 260 may be configured to decrypt at least the portion of the document using the image captured by the imaging device 22 and the biometric information detected by the biometric detection device 24. The decryption module 260 may be configured to decrypt the portion of the document using a decryption algorithm corresponding to the encryption algorithm used by the encryption module 142 of the encryption device 10 for encrypting the document. For example, in case the encryption module 142 uses the biometric information itself as a secret key of a symmetric-key cryptography algorithm, the decryption module 260 may also use the biometric information itself as a decryption key. Further, for example, in case the encryption module 142 generates a secret key of a symmetric-key cryptography algorithm from the biometric information, the decryption module 260 may need to be configured to generate a decryption key from the biometric information using the same key generation algorithm as the encryption module 142.

In any examples of the decryption module 260 as described above, if the user who has provided the biometric information is the intended receiver R of the document, the decryption key would be the same as the encryption key and, thus, the decryption would be successful. On the other hand, if the user who has provided the biometric information is not the intended receiver R of the document, the decryption key would be different from the encryption key and, thus, the decryption would be unsuccessful.

The display module 262 may be configured to instruct the display device to display at least the portion of the document decrypted by the decryption module 260.

The display device 28 may be configure to display, in response to the instruction from the display module 262, at least the portion of the document decrypted by the decryption module 260. The display device 28 may be a device to present visual representation of data, for example, liquid crystal display.

Figure 4:
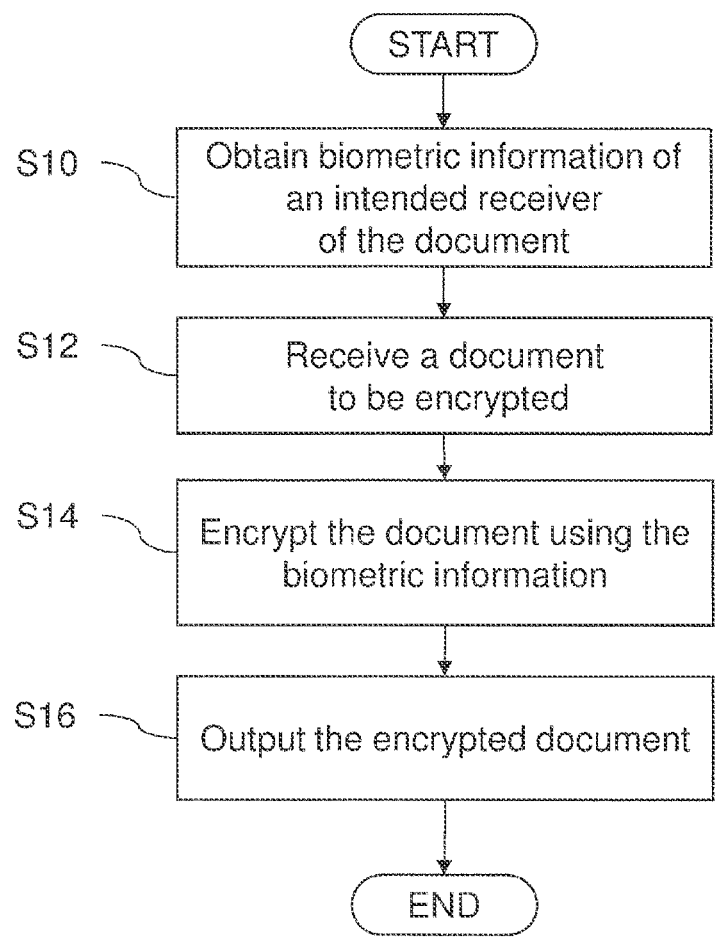
FIG. 4 shows a flowchart of exemplary processing performed by the encryption device.

FIG. 4 shows a flowchart of exemplary processing performed by the encryption device 10 when encrypting a document. The exemplary processing shown in FIG. 4 may be started, for example, in response to an instruction to encrypt a document, input by the sender S via an input device (not shown). Such an instruction may include which document to encrypt and identification information of an intended receiver of the document. Alternatively or in addition, the encryption device 10 may start the exemplary processing shown in FIG. 4 when an application within the encryption device 10 or an application in a computer connected to the encryption device 10 instructs the processor 14 of the encryption device 10 to encrypt a document. The instruction from an application may also include which document to encrypt and identification information of an intended receiver of the document.

The exemplary processing shown in FIG. 4 starts at step S10. In step S10, the processor 14 obtains biometric information of an intended receiver of the document. For example, the processor 14 may obtain the biometric information of the intended receiver from the database 50 storing biometric information of possible receivers of documents issued by the sender S. When the processor 14 receives identification information of the intended receiver, the processor 14 may retrieve the biometric information from the database 50 using the received identification information. Alternatively, the processor 14 may obtain the biometric information of the intended receiver from the biometric detection device 12. As stated above, the biometric information may include features extracted from a fingerprint, an image of an eye, an image of a face, an image of palm veins, a palm print or a voiceprint. After step S10, the processing proceeds to step S12.

In step S12, the document receiving module 140 of the processor 14 receives a document to be encrypted. In one example, the document receiving module 140 may receive an electronic document from a storage device (not shown) within the encryption device 10. In another example, the document receiving module 140 may receive an electronic document from an external computer (not shown). In yet another example, the document receiving module 140 may receive an electronic document from an external database (not shown) which stores the electronic document. After step S12, the processing proceeds to step S14.

In step S14, the encryption module 142 of the processor 14 encrypts the document received in step S12, using the biometric information of the intended receiver. For example, the encryption module 142 may generate an encryption key from the biometric information obtained in step S10 and encrypt the document with the generated encryption key. Alternatively, the encryption module 142 may use the biometric information obtained in step S10 as the encryption key. After step S14, the processing proceeds to step S16.

In step S16, the output module 144 of the processor 14 outputs the document encrypted in step S14. For example, the output module 144 may output the encrypted document as an electronic document E. The output module 144 may send out the electronic document E to the receiver device 30 and/or store the electronic document E in a storage device (not shown) accessible from the processor 14. Alternatively or in addition, the output module 144 may output the encrypted document as a physical document P. For instance, the output module 144 may instruct the printer 60 to print the encrypted document on paper. Further, in case the decryption device 20 is implemented using an AR device, in step S16, the output module 144 may include in the output document a marker to be detected by the AR device. The marker can be a trigger for the AR device to know what content and when to display the content. For instance, the AR device functioning as the decryption device 20 can start processing for decrypting the encrypted document when the AR device detects the marker. The marker may be any unique design such as a logo, text, barcode or QR code. The processing ends after step S16.

It should be noted that the exemplary processing shown in FIG. 4 is merely one example of the processing performed by the encryption device 10. In other examples, processing different from that of FIG. 4 may be performed by the encryption device 10. For example, step S10 of FIG. 4 may be performed after step S12. Alternatively, steps S10 and S12 may be performed simultaneously in parallel. Further, for example, in case the biometric information of the intended receiver is detected by the biometric detection device at step S10 of FIG. 4, the processor 14 may perform a processing step of storing the detected biometric information in the database 50, in addition to the processing steps shown in FIG. 4.

Further, in the exemplary processing shown in FIG. 4, the processor 14 of the encryption device 10 obtains the biometric information of the intended receiver of the document in step S10 and the encryption module 142 of the processor 14 encrypts the document using the obtained biometric information in step S14. In another example, the encryption module 142 may obtain from the database 50 an encryption key generated from the biometric information of the intended receiver of the document in step S10, instead of obtaining the biometric information itself. In this example, the encryption module 142 may generate the encryption key and store the encryption key in the database 50 when the intended receiver R lets his/her biometric information detected by the biometric detection device 12, before a document to be encrypted is instructed to the processor 14. Further, in a variation of this example, the generation and storing of the encryption key may be performed by a device other than the encryption device 10. This other device may be configured to obtain biometric information either from a biometric detection device or the database 50, generate an encryption key from the obtained biometric information and store the generated key in the database 50. The encryption module 142 of the processor 14 in the encryption device 10 may retrieve the encryption key from the database 50 when encrypting a document.

Figure 5:
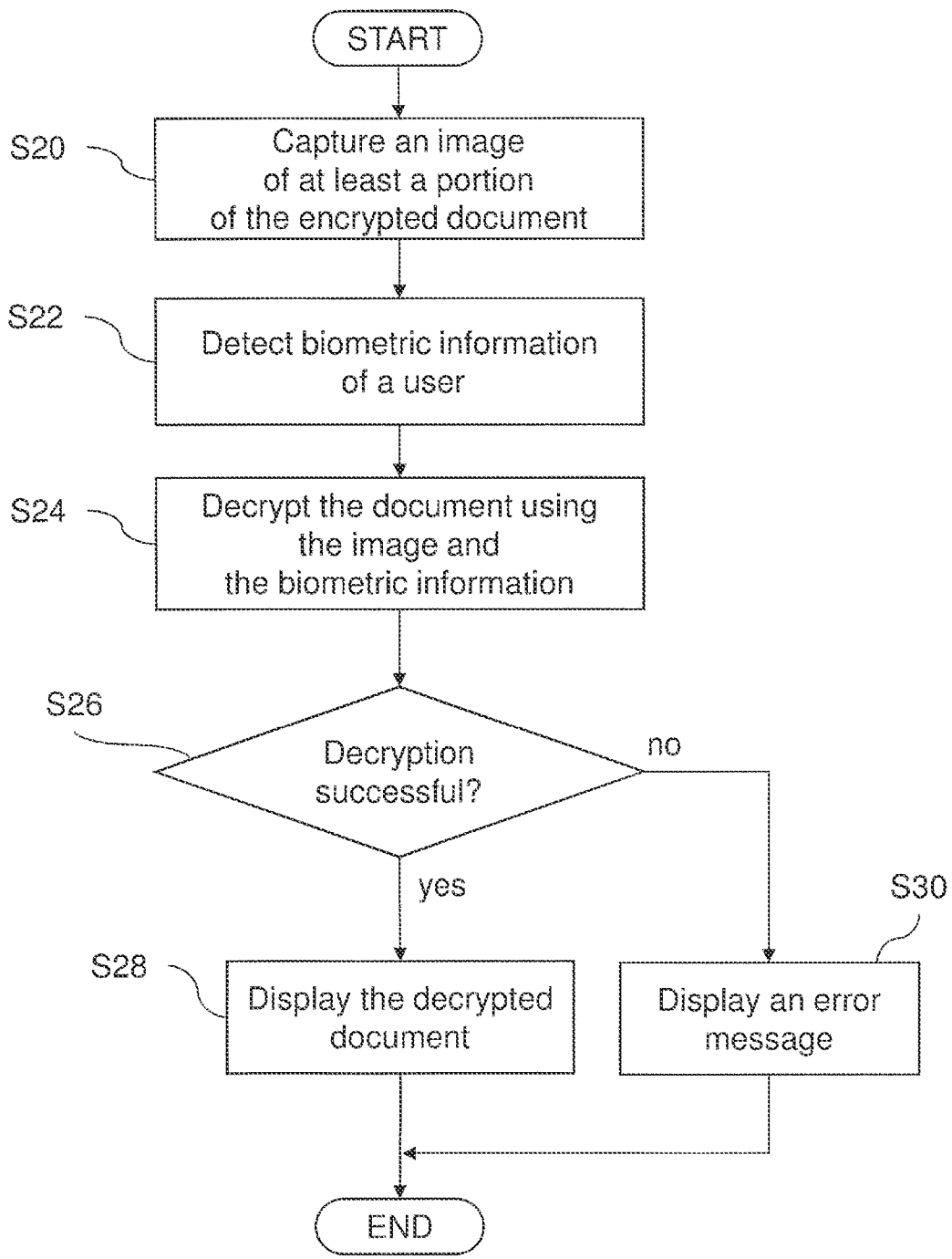
FIG. 5 shows a flowchart of exemplary processing performed by the decryption device.

FIG. 5 shows a flowchart of exemplary processing performed by the decryption device 20. The exemplary processing shown in FIG. 5 may be started, for example, when the decryption device 20 detects the marker for an AR device included in the document with encrypted content. For instance, the imaging device 22 may capture an image of the marker in the document, the processor 26 may detect the image as the marker and then the processor 26 may start the processing shown in FIG. 5. Alternatively or in addition, the exemplary processing shown in FIG. 5 may be started when the user of the decryption device 20 provides an input instructing to decrypt a document, using an input device (not shown).

The exemplary processing shown in FIG. 5 starts at step S20. In step S20, the imaging device 22 captures an image of at least a portion of the encrypted document. The encrypted content of the document may be visually presented on a display of the receiver device 30 in case the receiver device 30 has received an electronic document E with encrypted content. In case the receiver R has received a physical document P, the encrypted content may be visually presented on a physical medium, e.g. paper. After step S20, the processing proceeds to step S22.

In step S22, the biometric detection device 24 detects biometric information of a user. For example, the biometric detection device 24 may detect the same type of biometric information as the type used for encrypting the document. As stated above, the biometric information may include features extracted from a fingerprint, an image of an eye, an image of a face, an image of palm veins, a palm print or a voiceprint. For facilitating the detection, the processor 26 may instruct the display device 28 to display a message requesting the user to provide the required type of biometric information. For example, if a fingerprint is required, the message may request the user to put his/her finger on a fingerprint reader (as an example of the biometric detection device 24). Further, for example, if an image of an eye is required for iris or retina scan, the message may request the user to let the eye scanner (as an example of the biometric detection device 24) scan his/her eye(s). After step S22, the processing proceeds to step S24.

In step S24, the decryption module 260 of the processor 26 decrypts at least the portion of the document using the image captured in step S20 and the biometric information detected in step S22. The decryption algorithm used in step S24 may correspond to the encryption algorithm used by the encryption device 10 for encrypting the document. For example, in case the biometric information itself is used as the encryption key of a symmetric-key algorithm, the decryption module 260 may use the detected biometric information itself as the decryption key in step S24. Further, for example, in case the encryption key of a symmetric-key algorithm is generated from the biometric information, the decryption module 260 may generate the decryption key in step S24 from the detected biometric information. After step S24, the processing proceeds to step S26.

In step S26, the decryption module 260 determines whether the decryption has been successful. If the user who has provided the biometric information is the intended receiver R of the document, the decryption would be successful. If the decryption has been successful (yes in step S26), the processing proceeds to step S28. In step S28, the display module 262 of the processor 26 displays the decrypted document on the display device 28. For example, the display module 262 may provide the display device 28 with the decrypted content of the document and instruct the display device 28 to display the decrypted content. The processing ends after step S28.

If the decryption module 260 determines that the decryption has been unsuccessful (no in step S26), the processing proceeds to step S30. In step S30, the display module 262 displays an error message on the display device 28. For example, the display module 262 may instruct the display device 28 to display a predetermined error message. The processing ends after step S30.

It should be noted that the exemplary processing shown in FIG. 5 is merely one example of the processing performed by the decryption device 20. For example, the decryption device 20 may end the processing shown in FIG. 5 without performing step S30. In case no error message is displayed when the decryption is unsuccessful, the display may, for example, display the image captured in step S20 including encrypted content of the document. Further, although step S20 is performed before S22 in FIG. 5, in another example, step S22 may be performed before step S20. In yet another example, steps S20 and S22 may be performed simultaneously in parallel.

Exemplary Embodiments with Public-Key Cryptography

In the following, exemplary embodiments involving public-key cryptography is described with reference to FIGS. 6 to 9. In the exemplary embodiments as will be described below, the encryption device 10, the decryption device 20, the receiver device 30 and the database 50 may be connected via the network 40, as shown in FIG. 1. In public-key cryptography, the receiver R may generate a key pair including a public key and a private key. The sender S may use the public key of the receiver R for encrypting the document and the receiver R may use the private key for decrypting the document. Examples of public-key cryptography algorithms may include, but not limited to, Diffie-Hellman key exchange and RSA algorithm.

Figure 6:
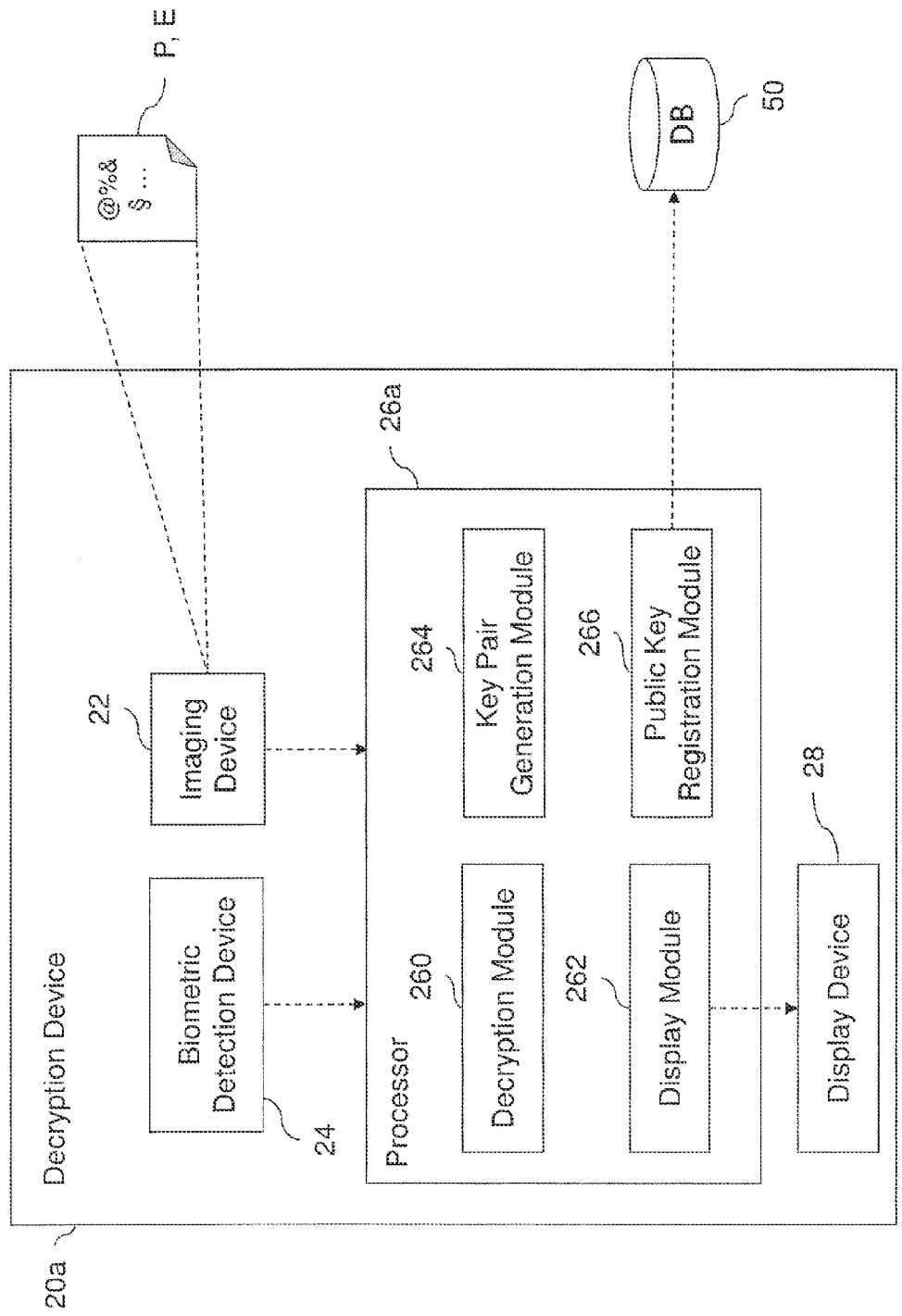
FIG. 6 shows another exemplary functional block diagram of the decryption device.

FIG. 6 shows an exemplary functional block diagram of the encryption device 20a in the exemplary embodiments involving public-key cryptography. In FIG. 6, components of the decryption device 20a identical to those of the decryption device 20 shown in FIG. 3 are indicated by identical reference numerals and detailed explanations thereon will not be made here.

The decryption device 20a comprises an imaging device 22, a biometric detection device 24 and a display device 28. Each of these devices may have the same configurations as the corresponding device as described above with reference to FIG. 3. The decryption device 20a further comprises a processor 26a.

The processor 26a may be configured to perform various processing to decrypt an encrypted document as the processor 26 as described above with reference to FIG. 3. The processor 26a shown in FIG. 6 may be further configured to perform various processing for generating a key pair for public-key cryptography. The processor 26a may include a key pair generation module 264 and a public key registration module 266, in addition to a decryption module 260 and a display module 262 that are also included in the processor 26 shown in FIG. 3.

The key pair generation module 264 may be configured to generate a key pair for a public-key cryptography algorithm, using the biometric information detected by the biometric detection device 24. For example, the key pair generation module 264 may receive the biometric information of the receiver from the biometric detection device 24 and generate a public key and a corresponding private key using the biometric information. In one example, the biometric information itself may be used as the private key and the public key corresponding to the private key may be generated. In another example, the private key may be generated directly from the biometric information and the public key corresponding to the private key may be generated.

The public key registration module 266 may be configured to store the public key generated by the key pair generation module 264 in the database 50. For example, the public key registration module 266 may access the database 50 via the network 40 (not shown in FIG. 6) and store the public key in the database 50. The public key may be stored in the database 50 in association with identification information of the receiver R.

In one example, the processor 26a may delete the detected biometric information and the private key from a storage device (not shown) of the decryption device 20a.

Figure 7:
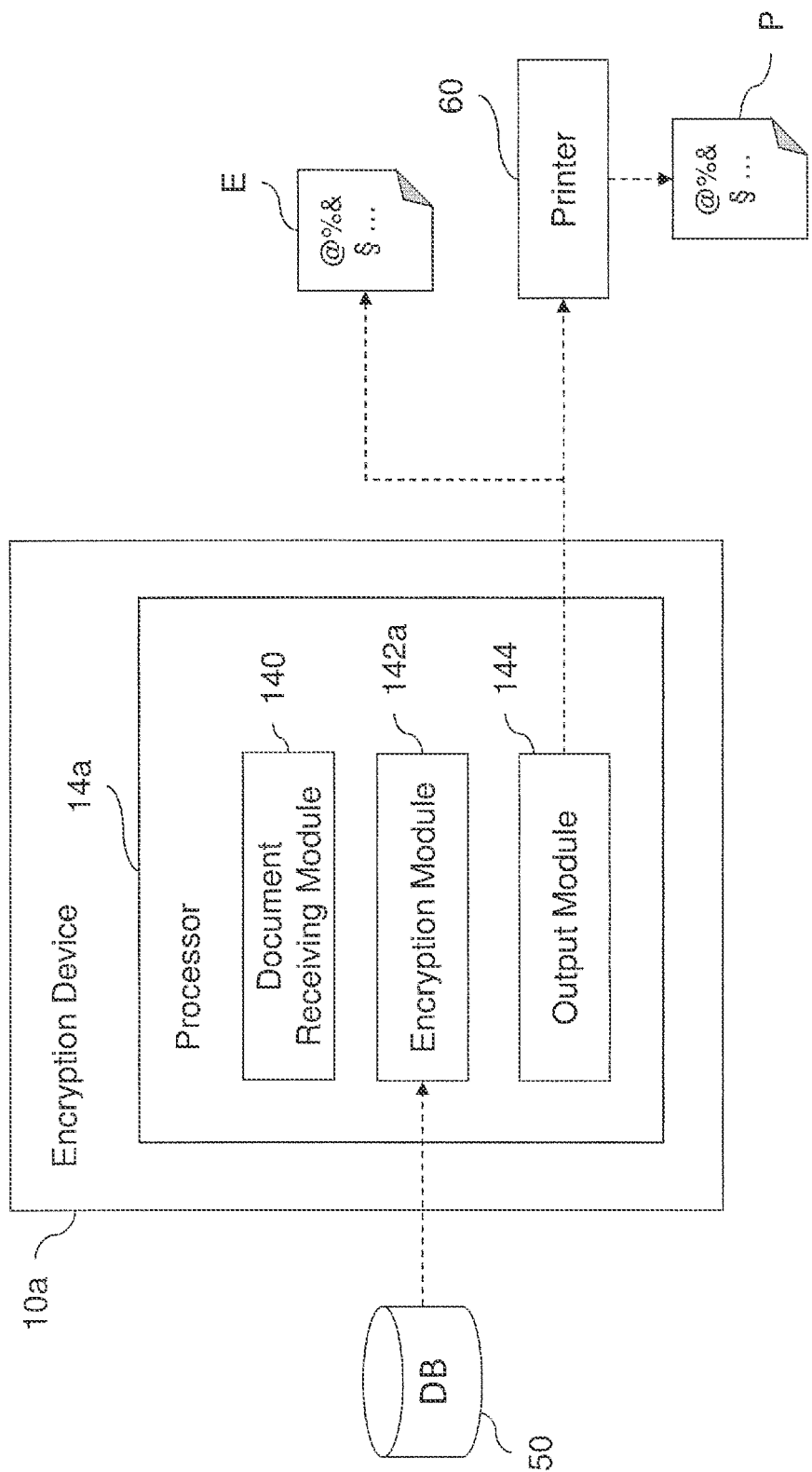
FIG. 7 shows another exemplary functional block diagram of the encryption device.

FIG. 7 shows an exemplary functional block diagram of an encryption device 10a in the exemplary embodiments involving public-key cryptography. In FIG. 7, components of the encryption device 10a identical to those of the encryption device 10 shown in FIG. 2 are indicated by identical reference numerals and detailed explanations thereon will not be made here.

The encryption device 10a shown in FIG. 7 does not need to comprise the biometric detection device 12 included in the encryption device 10 shown in FIG. 2. The encryption device 10a comprises a processor 14a. The processor 14a may be configured to perform various processing to encrypt a document. The processor 14 may include a document receiving module 140, an encryption module 142a and an output module 144.

The document receiving module 140 and the output module 144 shown in FIG. 7 may have the same configurations as those shown in FIG. 2.

The encryption module 142a may be configured to encrypt a document received by the document receiving module 140 using the public key of the intended receiver R of the document. For example, the encryption module 142a may retrieve the public key of the intended receiver R from the database 50 and encrypt the document using the retrieved public key.

Figure 8:
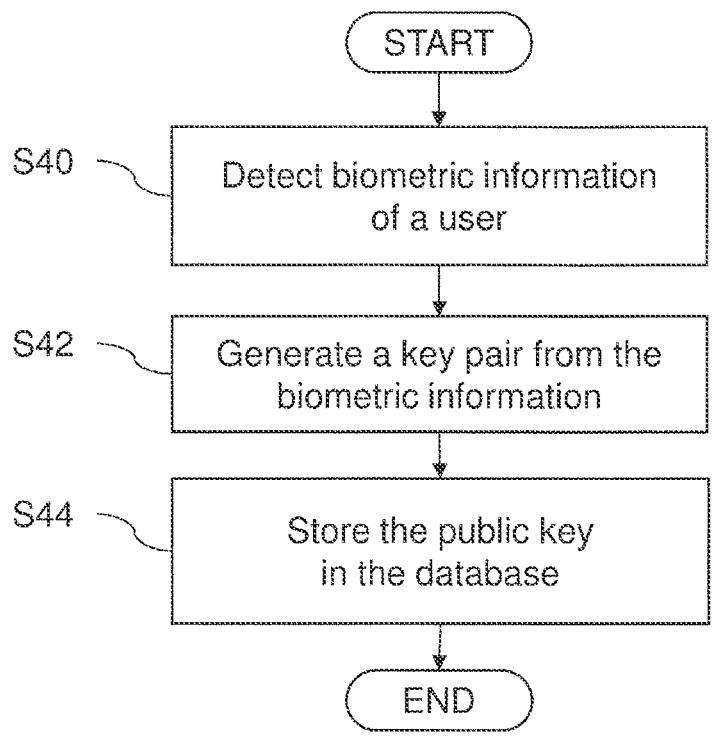
FIG. 8 shows a flowchart of other exemplary processing performed by the decryption device.

FIG. 8 shows a flowchart of exemplary processing performed by the decryption device 20a when generating a key pair for public-key cryptography. The exemplary processing shown in FIG. 8 may be started, for example, in response to an instruction to generate a key pair, input by a user, e.g. the receiver R, via an input device (not shown).

The exemplary processing shown in FIG. 8 starts at step S40. In step S40, the biometric detection device 24 detects biometric information of a user of the decryption device 20. The user may be the receiver R who can receive documents issued by the sender S. The detection of the biometric information in step S40 may be performed in a same manner as step S22 of FIG. 5 as described above. After step S40, the processing proceeds to step S42.

In step S42, the key pair generation module 264 of the processor 26a may generate a key pair, a public key and a private key, using the biometric information detected in step S40. For example, the key pair generation module 264 may use the biometric information itself as the private key and generate the public key corresponding to the private key. Alternatively, the key pair generation module 264 may generate the private key directly from the biometric information and then generate the public key corresponding to the private key. After step S42, the processing proceeds to step S44.

In step S44, the public key registration module 266 stores, in the database 50, the public key generated in step S42. For example, the public key registration module 266 may access the database 50 via the network 40 and store the public key in the database 50 in association with the identification information of the user. The processing ends after step S44.

Figure 9:
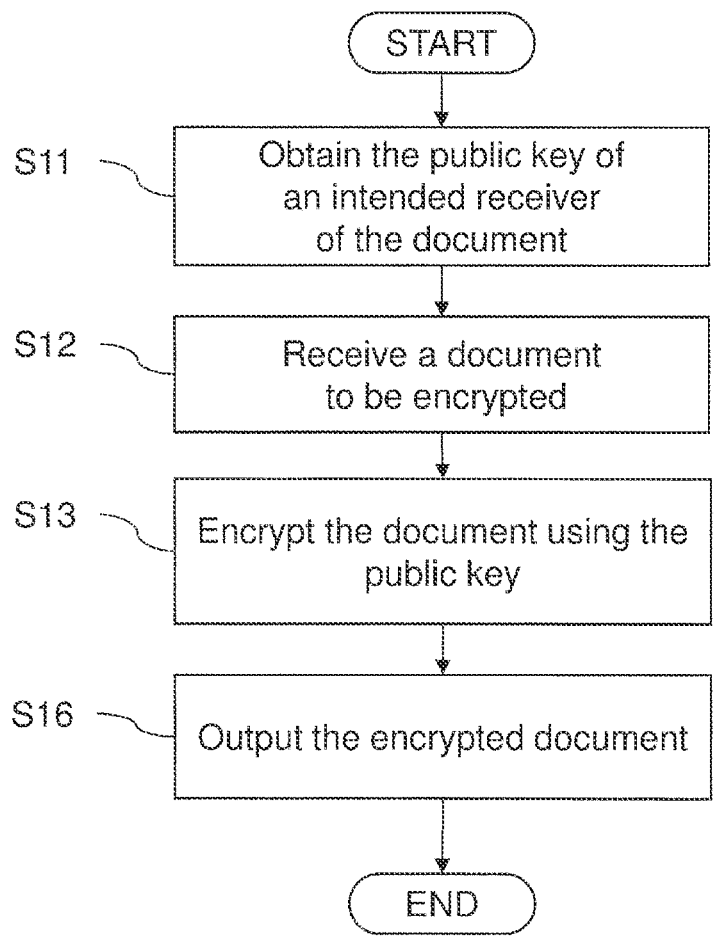
FIG. 9 shows a flowchart of other exemplary processing performed by the encryption device.

FIG. 9 shows an exemplary flowchart of processing performed by the encryption device 10a. The exemplary flowchart shown in FIG. 9 is the same as the exemplary flowchart shown in FIG. 4 with respect to the encryption device 10, except for steps S11 and S13. The situations in which the exemplary processing shown in FIG. 9 may be started can be the same as the exemplary situations as described above with respect to the start of the processing shown in FIG. 4. For example, the exemplary processing shown in FIG. 9 may be started in response to an instruction by the sender S or by an application to encrypt a document.

The exemplary processing shown in FIG. 9 starts at step S11. In step S11, the encryption module 142a of the processor 14a obtains the public key of an intended receiver of the document. For example, the encryption module 142a may retrieve the public key of the intended receiver from the database 50. After step S11, the processing proceeds to step S12.

In step S12, the document receiving module 140 of the processor 14a receives a document to be encrypted. The processing of step S12 of FIG. 9 may be performed in the same manner as step S12 as described above with reference to FIG. 4. After step S12, the processing proceeds to step S13.

In step S13, the encryption module 142a encrypts the document received in step S12 using the public key obtained in step S11. After step S13, the processing proceeds to step S16.

In step S16, the output module 144 of the processor 14a outputs the document encrypted in step S13. The processing of step S16 of FIG. 9 may be performed in the same manner as step S16 as described above with reference to FIG. 4. For example, the output module 144 may output the encrypted document as an electronic document E and/or as a paper document P. In case the decryption device 20 is implemented using an AR device, the output module 144 may include, in step S16, the public key in the output document as a marker to be detected by the AR device. As stated above with respect to step S16 of FIG. 4, the marker can be a trigger for the decryption processing by the AR device functioning as the decryption device 20. The processing ends after step S16.

In other examples of processing shown in FIG. 9, steps S11 and S12 may be performed simultaneously in parallel or step S12 may be performed before step S11.

In the exemplary embodiments involving public-key cryptography, the decryption device 20a may perform processing according to an exemplary flowchart shown in FIG. 5 when decrypting the encrypted document. The difference of the processing in the exemplary embodiments involving public-key cryptography from the processing as described above with reference to FIG. 5 may be that, the decryption in step S24 can be made using the private key of the receiver R. The private key can be generated from the biometric information detected in step S22. Alternatively, the biometric information itself can be used as the private key.

Variations

It should be appreciated by those skilled in the art that the embodiments and their variations as described above with reference to FIGS. 1 to 9 are merely exemplary and other embodiments and variations may exist.

For example, the generation of a key pair for public-key cryptography performed by the processor 26a of the decryption device 20a shown in FIG. 6 may be performed by a computer other than the decryption device 20a. In one example, the receiver device 30 may include a processor having the key pair generation module 264 and the public key registration module 266 as described with reference to FIG. 6 and perform the generation of the key pair and store the public key in the database 50.

Further, for instance, in the exemplary embodiments with public-key cryptography described above with reference to FIGS. 6 to 9, the document itself may be encrypted using the public key of the receiver R and decrypted using the private key of the receiver R. In another example, the document can be encrypted by a secret key other than the key pair of the receiver R. In this example, not the document but the secret key which has been used for encrypting the document may be encrypted by the public key of the receiver R. In this example, the encrypted document output by encryption device 10a may include the encrypted content of the document and the encrypted secret key. The decryption device 20a may first decrypt the secret key using the private key of the receiver R and then use the decrypted secret key for decrypting the document. Also in this example, the public key and the private key of the receiver R may be generated using the biometric information of the receiver R as described above with reference to FIG. 6.

In yet another example, the encryption device 10a and the decryption device 20a may exchange a shared secret key for encrypting and decrypting the document according to Diffie-Hellman key exchange algorithm. The public key and the private key of the receiver R used within the Diffie-Hellman key exchange algorithm may be generated using the biometric information of the receiver R as described above with reference to FIG. 6. After exchanging the shared secret key according to Diffie-Hellman key exchange algorithm, the encryption device 10a can encrypt the document with the shared secret key and the decryption device 20a can decrypt the document with the shared secret key.

Further, for example, in the exemplary embodiments described above with reference to FIGS. 1 to 9, the database 50 is connected to the encryption device 10 or 10a (hereinafter, the "encryption device 10" may refer also to the "encryption device 10a" unless otherwise noted) via the network 40. However, in variations of these exemplary embodiments, the database 50 may be connected to the encryption device 10 via a network separate from the network 40. Alternatively, the database 50 may be provided within the encryption device 10. In these variations, when the decryption device 20 or 20a (hereinafter, the "decryption device 20" may also refer to the "decryption device 20a" unless otherwise noted) needs to store the biometric information or public key in the database 50, the decryption device 20 may send the biometric information or the public key to the encryption device 10 via the network 40. The encryption device 10 may then store the biometric information or the public key.

Further, for example, in the exemplary embodiments with symmetric-key cryptography as described above with respect to FIGS. 2 to 5, the database 50 may store the biometric information including features extracted from human characteristics such as a fingerprint, an image of an eye, an image of a face, an image of palm veins, a palm print or a voiceprint. Alternatively or in addition, the database 50 may store image data of the human characteristics from which the features can be extracted as the biometric information. For example, an image of a fingerprint, an image of an eye, an image of a face, an image of palm veins, an image of a palm print, or an image of a voice print may alternatively or additionally stored in the database 50. The encryption device 10 may extract features from the image data stored in the database 50 and use the extracted features for obtaining the encryption key.

The various examples of the decryption device 20 as described above can treat an electronic document E and a physical document P in a same manner. From the perspective of the user, the same set of operations can be required in either case of decrypting an electronic document E or a physical document P. In other words, the user can simply let the biometric detection device 24 detect his/her biometric information and let the imaging device 22 of the decryption device 20 capture the visual representation of the encrypted document, either on a display of the receiver device 30 or on a physical medium such as paper. Then, provided that the user is the intended receiver of the document, the user can read the decrypted content of the document displayed on the display device 28 of the decryption device 20. Accordingly, the decryption device 20 in various examples as described herein can make it more convenient for the user to decrypt and read an encrypted document. In other words, the decryption device 20 in various examples as described herein can provide improved usability.

Further, in various examples of the decryption device 20 as described above, the decryption of the document may be performed using the biometric information of the user. More specifically, the decryption key may be the biometric information itself or be generated from the biometric information. Since the biometric information may be obtained from the human characteristics of the user, the user does not need to memorize or store the decryption key. This can improve the security and the usability. Moreover, since the biometric information can be considered as a kind of identification information of the user and only the biometric information of the intended receiver of the document can result in a successful decryption of the document, a successful decryption using the biometric information can indicate the authenticity of the user. Consequently, the description device 20 in various examples as described above may not need an additional authentication process for confirming whether or not the user is the intended receiver of the document, which can improve efficiency of the decryption process.

The various examples of the decryption device 20 as described above may be implemented on a mobile device or a wearable device. For example, a mobile device or wearable device may be configured to have the functionalities of any one of the various examples of the decryption device 20. As stated above, the mobile device or the wearable device used for implementing the various examples of the decryption device 20 may be an AR device.

In an exemplary implementation using a wearable device as an example of an AR device, the wearable device may be in a form of glasses, such as Google Glass developed by Google Inc. When a glass-style wearable device functions as any one of the various examples of the decryption device 20, the biometric information can be detected by scanning at least one eye of the user while the user wears the glass-style wearable device. Further, the decrypted content of the document may be displayed on the glasses having a function of a display device. In this exemplary implementation, all the user needs to do may be simply wear the glass-style wearable device and see the encrypted content of the document on a display of the receiver device 30 or on a physical medium through the glasses. Then the imaging device on the glasses can capture an image of at least a portion of the encrypted document, decrypt the document using the biometric information detected by scanning at least one eye of the user and display the decrypted content of the document.

Further, in various examples of the decryption device 20 as described above, the decrypted content of the document may be displayed only by the decryption device 20 and not on a physical medium on which the encrypted content is printed nor on a display of the receiving device 30 that has received an electronic document E with encrypted content. Consequently, presentation of the decrypted content of the document can be restricted to the display of the decryption device 20, which can lead to improved security of the document.

Hardware Configuration

Figure 10:
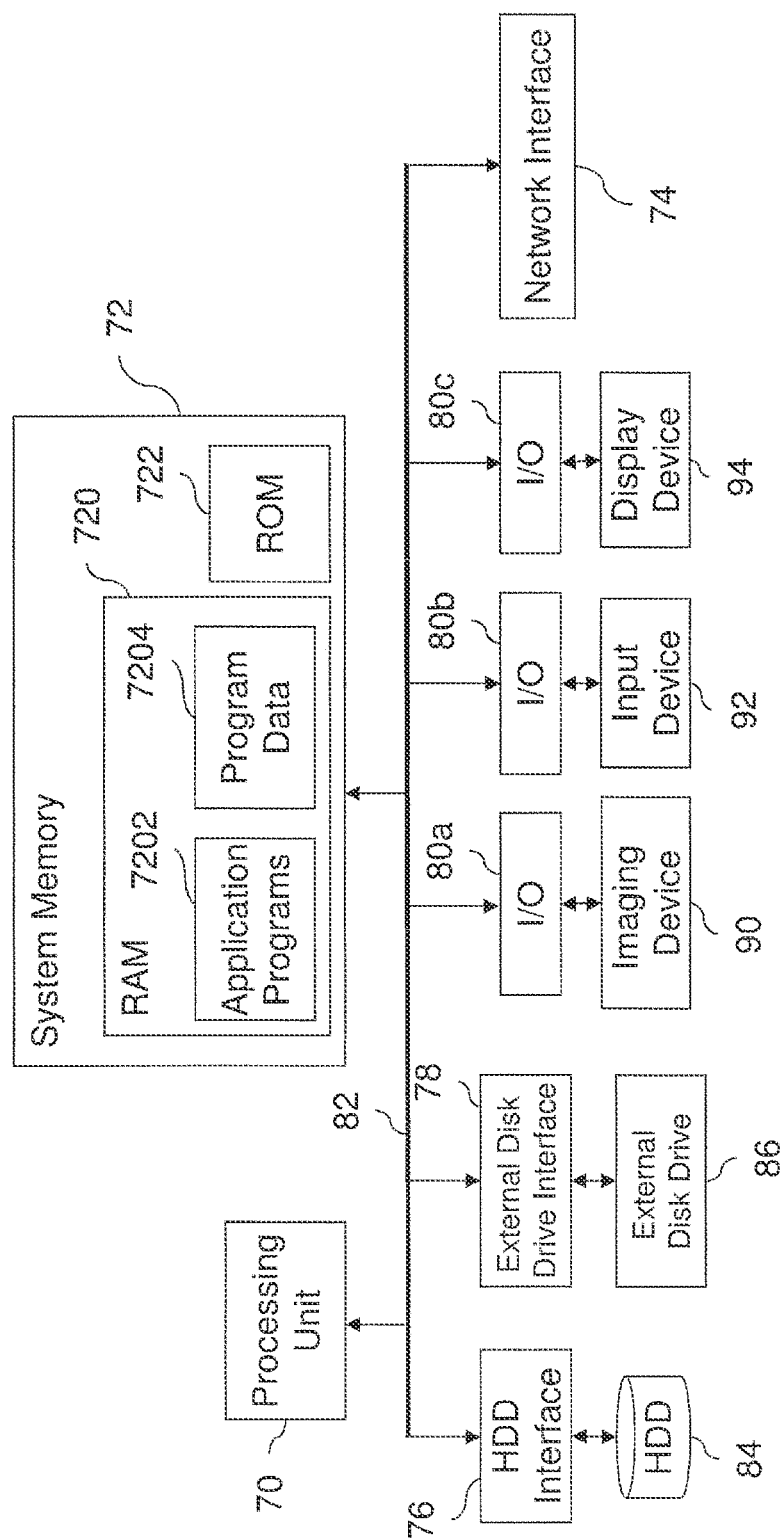
FIG. 10 shows an exemplary hardware configuration of a computer that may be used to implement the encryption device and/or the decryption device.

The various examples of the encryption device and of the decryption device as described above may be implemented using a computer. The computer may be a general purpose computer such as a personal computer. Alternatively, the computer may be a computer incorporated in a mobile device such as a mobile phone, tablet computer, PDA (personal digital assistant) or laptop computer. In yet another example, the computer may be a computer incorporated in a wearable device. FIG. 10 shows an exemplary hardware configuration of a computer that may be used to implement the encryption device and/or the decryption device. The computer shown in FIG. 10 includes a processing unit 70, a system memory 72, a network interface 74, a hard disk drive (HDD) interface 76, an external disk drive interface 78 and input/output (I/O) interfaces 80. These components of the computer are coupled to each other via a system bus 82. The processing unit 70 may perform arithmetic, logic and/or control operations by accessing the system memory 72. The processing unit 70 may implement the processors of the exemplary encryption device and/or decryption device described above. The system memory 72 may store information and/or instructions for use in combination with the processing unit 70. The system memory 72 may include volatile and non-volatile memory, such as a random access memory (RAM) 720 and a read only memory (ROM) 722. A basic input/output system (BIOS) containing the basic routines that helps to transfer information between elements within the general purpose computer, such as during start-up, may be stored in the ROM 722. The system bus 82 may be any of several types of bus structures including a memory bus or memory controller, a peripheral bus, and a local bus using any of a variety of bus architectures.

The computer may include a network interface 74 for communicating with other computers or devices via a network.

Further, the computer may include a hard disk drive (HDD) 84 for reading from and writing to a hard disk (not shown), and an external disk drive 86 for reading from or writing to a removable disk (not shown). The removable disk may be a magnetic disk for a magnetic disk drive or an optical disk such as a CD ROM for an optical disk drive. The HDD 84 and the external disk drive 86 are connected to the system bus 82 by a HDD interface 76 and an external disk drive interface 78, respectively. The drives and their associated computer-readable media provide non-volatile storage of computer-readable instructions, data structures, program modules and other data for the general purpose computer. The data structures may include relevant data for the implementation of the method for encrypting and/or decrypting a document, as described herein. The relevant data may be organized in a database, for example a relational or object database.

Although the exemplary environment described herein employs a hard disk (not shown) and an external disk (not shown), it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk, ROM 722 or RAM 720, including an operating system (not shown), one or more application programs 7202, other program modules (not shown), and program data 7204. The application programs may include at least a part of the functionality as described above.

The computer may also include an imaging device 90 such as a camera, an input device 92 such as mouse and/or keyboard and a display device 94 such as liquid crystal display. The imaging device 90, the input device 92 and the display device 94 may be connected to the system bus 82 via I/O interfaces 80a to 80c.

In addition or as an alternative to an implementation using a computer as shown in FIG. 10, a part or all of the functionality of the exemplary embodiments described herein may be implemented as one or more hardware circuits. Examples of such hardware circuits may include but are not limited to: Large Scale Integration (LSI), Reduced Instruction Set Circuits (RISC), Application Specific Integrated Circuit (ASIC) and Field Programmable Gate Array (FPGA).

The subject matter described in the application can be implemented as a method or as a system, possibly in the form of one or more computer program products. The subject matter described in the application can be implemented in a data signal or on a machine readable medium, where the medium is embodied in one or more information carriers, such as a CD-ROM, a DVD-ROM, a semiconductor memory, or a hard disk. Such computer program products may cause a data processing apparatus to perform one or more operations described in the application.

In addition, subject matter described in the application can also be implemented as a system including a processor, and a memory coupled to the processor. The memory may encode one or more programs to cause the processor to perform one or more of the methods described in the application. Further subject matter described in the application can be implemented using various machines.

The invention claimed is:

1. A decryption device for decrypting an encrypted document previously encrypted by an encryption device using biometric information of an intended receiver of the encrypted document, comprising:
an imaging device configured to capture an image of at least a portion of a visual representation of the encrypted document;

a biometric detection device configured to detect biometric information of a user attempting to decrypt the encrypted document;
  wherein the capture an image and the detect biometric information occur in parallel;
  wherein the captured image includes a marker indicating the biometric detection device is an augmented reality device, and the marker is a unique design comprising a logo, text, barcode or quick response (QR) code;
at least one hardware processor configured to decrypt at least the portion of the visual representation of the encrypted document using the captured image and based on the detected biometric information of the user compared to the biometric information of the intended receiver: and
a display device configured to display at least a portion of a decrypted document when the detected biometric information of the user matches with the biometric information of the intended receiver, wherein the decrypted document is at least the portion of the visual representation of the encrypted document decrypted by the at least one hardware processor.

2. The decryption device according to claim 1, wherein the decryption device is implemented on a mobile device, wherein the mobile device is an augmented reality device.

3. The decryption device according to claim 1, wherein the decryption device is implemented on a wearable device, wherein the wearable device is an augmented reality device.

4. The decryption device according to claim 3, wherein the wearable device is in a form of glasses.

5. The decryption device according to claim 4, wherein:
the biometric information used for decrypting the visual representation of the encrypted document is obtained from an image of at least one eye of the intended receiver; and
the biometric detection device is an eye scanner configured to detect biometric information from an image of at least one eye of the user attempting to decrypt the encrypted document.

6. The decryption device according to claim 3, wherein the wearable device is in a form of an anklet.

7. The decryption device according to claim 1, wherein the biometric detection device is configured to obtain the biometric information from a fingerprint, an image of an eye, an image of a face, an image of palm veins, a palm print or a voiceprint.

8. A method for decrypting an encrypted document previously encrypted by an encryption device using biometric information of an intended receiver of the document being implemented by one or more processors forming part of a computing device and comprising:
  capturing, by an imaging device, an image of at least a portion of a visual representation of the encrypted document;
  detecting, by a biometric detection device, biometric information of a user attempting to decrypt the encrypted document;
    wherein the capture an image and the detect biometric information occur in parallel;
    wherein the captured image includes a marker indicating the biometric detection device is an augmented reality device, and the marker is a unique design comprising a logo, text, barcode or quick response (QR) code;
  decrypting, by at least one processor, at least the portion of the visual representation of the encrypted document using the captured image and based on the detected biometric information of the user compared to the biometric information of the intended receiver; and
  displaying, by a display device, at least a portion of a decrypted document, when the detected biometric information of the user matches with the biometric information of the intended receiver, wherein the decrypted document is at least the portion of the visual representation of the encrypted document decrypted by the at least one processor.

9. The method according to claim 8, wherein the decrypting of at least the portion of the encrypted document includes generating a key for decrypting the encrypted document from the detected biometric information of the user.

10. The method according to claim 8, wherein the encrypting and the decrypting are performed according to a public-key cryptography algorithm and wherein the encrypting of the document uses a secret key, generated using the biometric information of the intended receiver and the secret key is encrypted by a public key, generated using the biometric information of the intended receiver.

11. A method for secure data transmission being implemented by one or more processors forming part of a computing device and comprising:
  encrypting, by a first processor, a document using biometric information of an intended receiver;
  outputting, by the first processor, the encrypted document as an electronic document or as a physical document;
  capturing, by an imaging device, an image of at least a portion of a visual representation of the encrypted document;
  detecting, by a biometric detection device, biometric information of a user attempting to decrypt the encrypted document;
    wherein the capturing an image and the detecting biometric information occur in parallel;
    wherein the captured image includes a marker indicating the biometric detection device is an augmented reality device, and the marker is a unique design comprising a logo, text, barcode or quick response (QR) code:
  decrypting, by a second processor, at least the portion of the visual representation of the encrypted document using the captured image and based on the detected biometric information of the user compared to the biometric information of the intended receiver; and
  displaying, by a display device, at least a portion of a decrypted document, when the detected biometric information of the user matches with the biometric information of the intended receiver, wherein the decrypted document is at least the portion of the visual representation of the encrypted document decrypted by the second processor.

12. The method according to claim 11, wherein the encrypting of a document includes generating a key for encrypting the document from the biometric information of the intended receiver.

13. The method of claim 11, wherein the encrypting and the decrypting are performed according to a symmetric-key cryptography algorithm.

14. The method according to claim 11, wherein the encrypting and the decrypting are performed according to a public-key cryptography algorithm and wherein the encrypting of the document uses a secret key, generated using the biometric information of the intended receiver and the secret key is encrypted by a public key, generated using the biometric information of the intended receiver.

15. The method according to claim 11, wherein the encrypting and the decrypting are performed according to a Diffie-Hellman key exchange algorithm.

16. A system for secure data transmission comprising:
an encryption device including a first hardware processor configured to:
encrypt a document using biometric information of an intended receiver; and
output the encrypted document as an electronic document or as a physical document; and
a decryption device for decrypting the encrypted document previously encrypted by the encryption device using biometric information of the intended receiver of the document, including:
an imaging device configured to capture an image of at least a portion of a visual representation of the encrypted document;
a biometric detection device configured to detect biometric information of a user attempting to decrypt the encrypted document;
wherein the capture an image and the detect biometric information occur in parallel;
wherein the captured image includes a marker indicating the biometric detection device is an augmented reality device, and the marker is a unique design comprising a logo, text, barcode or quick response (QR) code;
a second hardware processor configured to decrypt at least a portion of the visual representation of the encrypted document using the captured image and based on the detected biometric information of the user compared to the biometric information of the intended receiver; and
a display device configured to display at least a portion of a decrypted document, when the detected biometric information of the user matches with the biometric information of the intended receiver, wherein the decrypted document is at least the portion of the visual representation of the encrypted document decrypted by the second hardware processor.

17. The system according to claim 16, wherein the first hardware processor of the encryption device or the second hardware processor of the decryption device is further configured to:
capture, by an imaging device, an image of at least a portion of a visual representation of the encrypted document;
detect, by a biometric detection device, biometric information of a user;
decrypt, by the first hardware processor, at least the portion of the visual representation of the encrypted document using the captured image and the detected biometric information;
generate a key for decrypting the encrypted document from the detected biometric information of the user; and
display, by a display device, at least a portion of a decrypted document, wherein the decrypted document is at least the portion of the visual representation of the encrypted document decrypted by the first or second hardware processor.

* * * * *